(12) United States Patent
Ikoma

(10) Patent No.: US 11,152,628 B2
(45) Date of Patent: Oct. 19, 2021

(54) FUEL CELL SYSTEM

(71) Applicant: BROTHER KOGYO KABUSHIKI KAISHA, Nagoya (JP)

(72) Inventor: Atsuki Ikoma, Nagoya (JP)

(73) Assignee: BROTHER KOGYO KABUSHIKI KAISHA, Aichi (JP)

(*) Notice: Subject to any disclaimer, the term of this patent is extended or adjusted under 35 U.S.C. 154(b) by 322 days.

(21) Appl. No.: 16/434,495

(22) Filed: Jun. 7, 2019

(65) Prior Publication Data

US 2019/0288304 A1 Sep. 19, 2019

Related U.S. Application Data

(63) Continuation of application No. PCT/JP2017/035202, filed on Sep. 28, 2017.

(30) Foreign Application Priority Data

Dec. 9, 2016 (JP) .............................. JP2016-239131

(51) Int. Cl.
*H01M 8/04029* (2016.01)
*H01M 8/04007* (2016.01)
(Continued)

(52) U.S. Cl.
CPC ......... *H01M 8/04029* (2013.01); *F16K 31/06* (2013.01); *H01M 8/02* (2013.01);
(Continued)

(58) Field of Classification Search
CPC ...... H01M 8/02; H01M 8/04; H01M 8/04029; H01M 8/04074; H01M 8/04768; H01M 8/10; H01M 8/04044
See application file for complete search history.

(56) References Cited

U.S. PATENT DOCUMENTS

2009/0087708 A1  4/2009 Yamashita et al.

FOREIGN PATENT DOCUMENTS

JP   2004-022436 A     1/2004
JP   2004022436 A  *  1/2004
(Continued)

OTHER PUBLICATIONS

Machine translation of JP-2004022436-A (Year: 2004).*
(Continued)

*Primary Examiner* — Brian R Ohara
*Assistant Examiner* — Brent C Thomas
(74) *Attorney, Agent, or Firm* — K&L Gates LLP

(57) ABSTRACT

A fuel cell system capable of preventing the decrease in the amount of coolant is provided. The fuel cell system is provided with: a power generation portion; a coolant flow passage through which a coolant flows that cools the power generation portion; a tank disposed on the coolant flow passage in a position below the power generation portion in the vertical direction and storing the coolant; an air flow passage connecting the uppermost part of the coolant flow passage in the vertical direction and the tank; and an on-off valve provided on the air flow passage. By the on-off valve being opened, the air in the tank is introduced into the coolant flow passage through the air flow passage, and the coolant in the coolant flow passage is introduced into the tank. Since the coolant flow passage never communicates with the atmosphere, the vaporized coolant is prevented from being released to the atmosphere, so that the decrease in the amount of coolant can be prevented.

11 Claims, 1 Drawing Sheet

(51) Int. Cl.
*H01M 8/02* (2016.01)
*H01M 8/04746* (2016.01)
*F16K 31/06* (2006.01)
*H01M 8/04* (2016.01)
*H01M 8/10* (2016.01)

(52) U.S. Cl.
CPC ......... *H01M 8/04* (2013.01); *H01M 8/04074* (2013.01); *H01M 8/04768* (2013.01); *H01M 8/10* (2013.01)

(56) References Cited

FOREIGN PATENT DOCUMENTS

| | | |
|---|---|---|
| JP | 2006-252780 A | 9/2006 |
| JP | 2007-188700 A | 7/2007 |
| JP | 2007-299581 A | 11/2007 |
| JP | 2015-103409 A | 6/2015 |
| WO | 2007/129602 A1 | 11/2007 |

OTHER PUBLICATIONS

International Preliminary Report on Patentability issued in connection with International Patent Application No. PCT/JP2017/035202, dated Jun. 11, 2019. (5 pages).
International Search Report issued in connection with International Patent Application No. PCT/JP2017/035202, dated Dec. 26, 2017. (4 pages).

\* cited by examiner

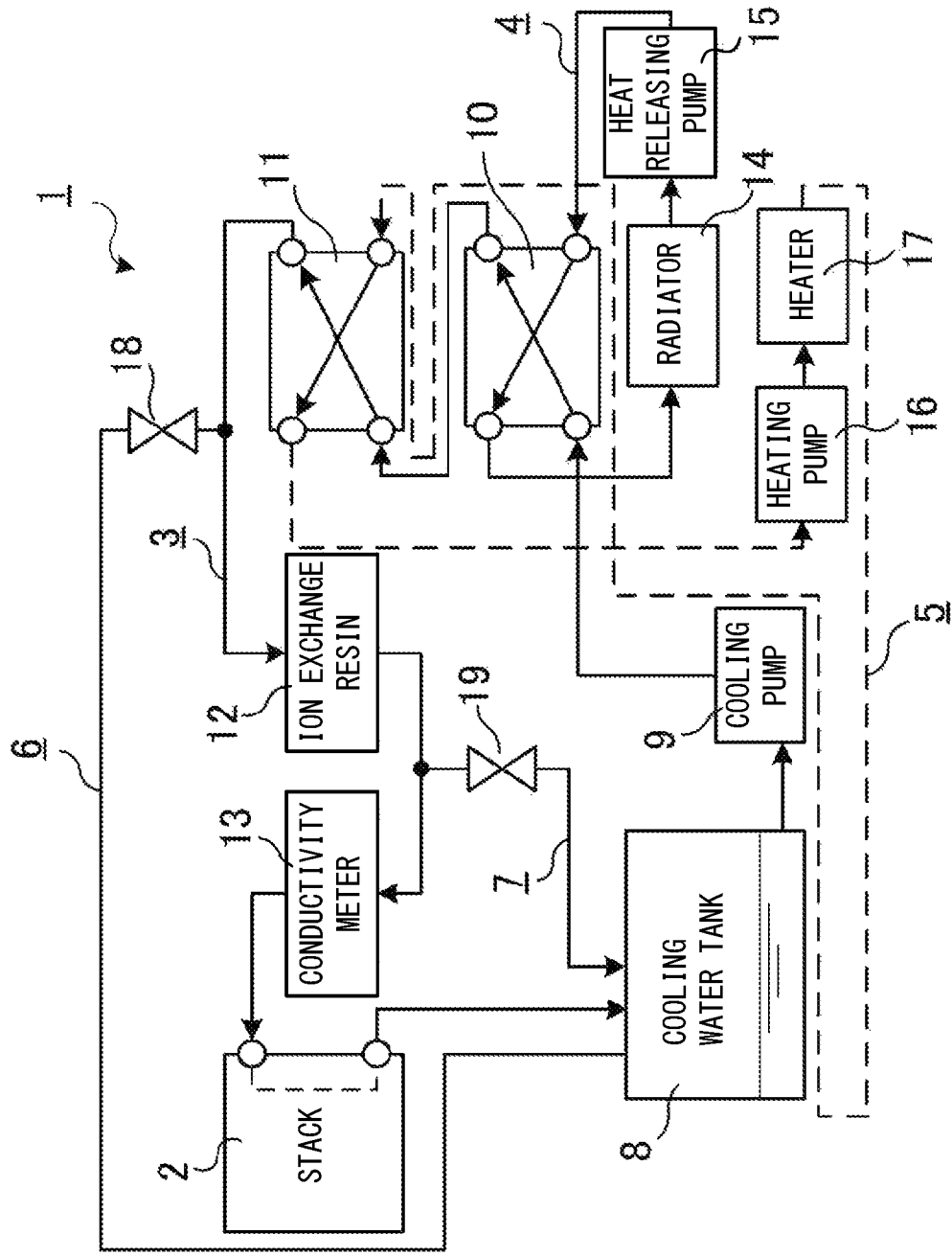

FUEL CELL SYSTEM

CROSS-REFERENCE TO RELATED APPLICATIONS

This application is a continuation application of PCT International Application No. PCT/JP2017/035202 which has an International filing date of Sep. 28, 2017 and designated the United States of America, and claiming priority on Patent Application No. 2016-239131 filed in Japan on Dec. 9, 2016.

FIELD

The present disclosure relates to a fuel cell system provided with: a fuel cell stack that generates power by causing a reaction between hydrogen and oxygen; a coolant flow passage through which a coolant cooling the fuel cell stack flows; and a tank provided on the coolant flow passage.

BACKGROUND

A fuel cell is provided with a fuel cell stack as a power generation portion that generates power by causing a chemical reaction between externally supplied hydrogen and oxygen. In the fuel cell stack, cooling is necessarily performed because heat is generated at the time of power generation. The cooling of the fuel cell stack is performed by forming a flow passage where a coolant such as water circulates. The water circulating through the flow passage flows inside the fuel cell stack. The water to which heat has been conducted from the fuel cell stack generating power is cooled by heat radiation by a heat exchanger such as a radiator, and again flows into the fuel cell stack.

As an example of the conventional fuel cell system, in a fuel cell system described in Japanese Patent Laid-Open Publication No. 2004-22436, the cooling water in the fuel cell stack is discharged to a cooling water tank when the power generation by the fuel cell stack is stopped.

In this fuel cell system, a differential pressure valve that sets the pressure inside the tank so as to be a predetermined pressure lower than atmospheric pressure is provided in the cooling water tank. Moreover, an air valve for discharging the cooling water in the cooling chamber of the fuel cell stack by introducing air into the cooling chamber is provided on the cooling passage.

SUMMARY

However, in the system of Japanese Patent Laid-Open Publication No. 2004-22436, when the air valve is opened to introduce air into the cooling passage and the air inside the cooling tank is released to the atmosphere through the differential pressure valve, the water as the coolant is vaporized and released to the atmosphere. For this reason, there is a possibility that the amount of coolant decreases as the air valve is opened. The decrease in the amount of coolant can decrease cooling capacity the fuel cell stack and increase the frequency of replenishment of the coolant by maintenance.

An object of the present disclosure is to provide a fuel cell system capable of preventing the decrease in the amount of coolant.

To attain this object, a fuel cell system is characterized by comprising: a coolant flow passage through which a coolant flows that cools a power generation portion generating power by causing a reaction between hydrogen and oxygen; a circulation pump that operates to circulate the coolant in the coolant flow passage; a heat exchanger that exchanges heat with the coolant in the coolant flow passage; a tank disposed on the coolant flow passage in a position below the power generation portion in a vertical direction and storing the coolant; an air flow passage having its one end connected to the coolant flow passage and having its other end connected to the tank; and a first on-off valve provided on the air flow passage to open or close the air flow passage, and part of the air flow passage is disposed in a position higher than an uppermost part of the coolant flow passage in the vertical direction.

In the fuel cell system, further, one end of the air flow passage is connected to the coolant flow passage in a position on a downstream side of the heat exchanger and an upstream side of the power generation portion in a flow direction of the coolant in the coolant flow passage.

The fuel cell system is further provided with an ion exchange resin that is provided on the coolant flow passage in a position on the downstream side of the heat exchanger and the upstream side of the power generation portion in the flow direction of the coolant in the coolant flow passage and removes an ion from the coolant circulating in the coolant flow passage, and one end of the air flow passage is connected to the coolant flow passage in a position on the downstream side of the heat exchanger and an upstream side of the ion exchange resin in the flow direction of the coolant in the coolant flow passage.

In the fuel cell system, further, one end of the air flow passage is connected to the coolant flow passage in a position above the ion exchange resin in the vertical direction.

In the fuel cell system, further, one end of the air flow passage is connected to the uppermost part of the coolant flow passage in the vertical direction.

In the fuel cell system, further, one end of the air flow passage is connected to the coolant flow passage from above.

In the fuel cell system, further, the number of first on-off valves provided on the air flow passage is one.

In the fuel cell system, further, the first on-off valve is a normally open type electromagnetic valve.

In the fuel cell system, further, a flow passage cross-sectional area of the air flow passage is smaller than a flow passage cross-sectional area of the coolant flow passage.

The fuel cell system is further provided with: a coolant bypass passage having its one end connected to the coolant flow passage in a position on a downstream side of the ion exchange resin in the flow direction of the coolant in the coolant flow passage and in a position below the ion exchange resin in the vertical direction, and having its other end connected to the tank; and a second on-off valve provided on the coolant bypass passage to open or close the coolant bypass passage.

In the fuel cell system, further, the second on-off valve is a normally open type electromagnetic valve.

According to the fuel cell system, by the first on-off valve being opened, the air in the tank is introduced into the coolant flow passage through the air flow passage and the coolant in the coolant flow passage is introduced into the tank. For this reason, the coolant flow passage never communicates with the atmosphere, so that the vaporized coolant is prevented from being released into the atmosphere. Moreover, since part of the air flow passage is disposed in a position higher than the uppermost part of the coolant flow passage in the vertical direction, when the first on-off valve is opened, the coolant never flows into the air flow passage, so that the air in the tank can be surely introduced into the coolant flow passage through the air flow passage.

Moreover, according to the fuel cell system, by the air flow passage being connected between the heat exchanger and the power generation portion, the coolant can be more surely introduced into the tank. Typically, the heat exchanger and the power generation portion are high in flow passage resistance because the flow passage thereinside is long and complicated. For this reason, by the air flow passage being connected between the heat exchanger and the power generation portion, it is made easy to introduce the coolant in the heat exchanger and the coolant in the power generation portion into the tank.

Moreover, according to the fuel cell system, by the air flow passage being connected between the heat exchanger and the ion exchange resin, the coolant can be more surely introduced into the tank. Typically, the ion exchange resin is high in flow passage resistance because a filter is provided thereinside. For this reason, by the air flow passage being connected between the heat exchanger and the ion exchange resin, it is made easy to introduce the coolant in the ion exchange resin into the tank.

Moreover, according to the fuel cell system, by the air flow passage being connected to the coolant flow passage in a position above the ion exchange resin in the vertical direction, it is made easy to introduce the air in the tank into the ion exchange resin and to introduce the coolant in the ion exchange resin into the tank.

Moreover, according to the fuel cell system, by air being introduced from the uppermost part of the coolant air passage in the vertical direction, the coolant of the entire coolant flow passage can be surely introduced into the tank.

Moreover, according to the fuel cell system, by one end of the air flow passage being connected to the coolant flow passage from above, the coolant does not readily enter the air flow passage. For this reason, the coolant can be more surely introduced into the tank.

Moreover, according to the fuel cell system, only by opening one on-off valve, the air in the tank is introduced into the coolant flow passage. For this reason, the number of parts is reduced and the cost can be held down.

Moreover, according to the fuel cell system, since the first on-off valve is a normally open type, even when power is shut off without receiving an instruction for draining, the first on-off valve is opened, so that the coolant can be introduced into the tank.

Moreover, according to the fuel cell system, since the flow passage cross-sectional area of the air flow passage is smaller than the flow passage cross-sectional area of the coolant flow passage, the coolant does not readily enter the air flow passage. For this reason, the coolant can be more surely introduced into the tank. Moreover, parts such as piping and joints of the air flow passage can be made small, so that the fuel cell system can be made compact.

Moreover, according to the fuel cell system, the coolant in the ion exchange resin can be introduced into the tank without passing through the power generation portion. For this reason, the coolant in the ion exchange resin can be more surely introduced into the tank.

Moreover, according to the fuel cell system, since the second on-off valve is a normally open type, even when power is shut off without receiving an instruction for draining, the second on-off valve is opened, so that the coolant can be introduced into the tank.

The above and further objects and features will more fully be apparent from the following detailed description with accompanying drawings.

BRIEF DESCRIPTION OF THE DRAWINGS

FIG. 1 is a conceptual view showing the arrangement of components of a fuel cell system according to an embodiment.

DETAILED DESCRIPTION

Hereinafter, an embodiment of the present disclosure will be described with reference to the drawings.

A fuel cell system 1 is, for example, a polymer electrolyte fuel cell. The fuel cell system 1 is provided with: a fuel cell stack (hereinafter, referred to as stack) 2 that generates power by causing a reaction between hydrogen and oxygen; a cooling water flow passage 3, a heat releasing liquid flow passage 4, a heating liquid flow passage 5, an air flow passage 6, and a cooling water bypass passage 7. A hydrogen supply portion that supplies hydrogen to the stack 2 and an oxygen supply portion that supplies oxygen to the stack 2 are not shown in the figure because they are known through Japanese Patent Laid-Open Publication No. 2004-22436.

On the cooling water flow passage 3, a cooling water tank 8, a cooling pump 9, a first heat exchanger 10, a second heat exchanger 11, an ion exchange resin 12 and a conductivity meter 13 are provided. The cooling water flow passage 3 is a tubular member, and the cooling water as the coolant flows inside the cooling water flow passage 3. The cooling water sent out from the cooling pump flows through the first heat exchanger 10, the second heat exchanger 11 and the ion exchange resin 12 in this order, and is introduced into the stack 2 after the conductivity is measured by the conductivity meter 13. The cooling water having flown through the flow passage in the stack 2 to be discharged is stored in the cooling water tank 8, and then, returns to the cooling pump 9 again. By the cooling pump 9 operating, the cooling water circulates in the cooling water flow passage 3.

The cooling water tank 8 and the cooling pump 9 are disposed substantially on the same level in the vertical direction. The cooling water tank 8 and the cooling pump 9 are disposed below the stack 2, the first heat exchanger 10, the second heat exchanger 11 and the ion exchange resin 12 in the vertical direction. The first heat exchanger 10 is disposed below the second heat exchanger 11 in the vertical direction.

The end, on the side connected to the cooling water tank 8, of the part of the cooling water flow passage 3 connecting the cooling water tank 8 and the cooling pump 9 is connected to the lower end of a side surface of the cooling water tank 8. Moreover, the end, on the side connected to the cooling water tank 8, of the part of the cooling water flow passage 3 connecting the stack 2 and the cooling water tank 8 is connected to the upper surface of the cooling water tank 8. The cooling water tank 8 has a volume larger than the volume of the entire cooling water flow passage 3 excepting the cooling water tank 8.

The ion exchange resin 12 has a filter thereinside, and removes an ion from the cooling water in the cooling water flow passage 3. If the ion concentration of the cooling water that cools the stack 2 becomes high, the electricity generated by the stack 2 leaks through the cooling water, so that the power generation efficiency of the stack 2 decreases. For this reason, the ion exchange resin 12 and the conductivity meter 13 are disposed on the upstream side of the stack 2 in the flow direction of the cooling water, and the ion concentration of the cooling water is monitored by the conductivity meter 13.

On the heat releasing liquid flow passage 4, a radiator 14 and a heat releasing pump 15 are provided, and the heat releasing liquid as the heating medium flows. The heat releasing liquid flow passage 4 is formed so that the heat releasing liquid sent out from the heat releasing pump 15 flows through the first heat exchanger 10, flows through the radiator 14 and then, returns to the heat releasing pump 15. The heat releasing liquid exchanges heat with the cooling water in the cooling water flow passage 3 at the first heat exchanger 10. As the heat releasing liquid, an antifreeze liquid such as ethylene glycol is used.

On the heating liquid flow passage 5, a heating pump 16 and a heater 17 are provided, and a heating liquid as the heating medium flows. The heating liquid flow passage 5 is formed so that the heating liquid sent out from the heating pump 16 flows through the heater 17, flows through the second heat exchanger 11 and then, returns to the heating pump 16. The heating liquid exchanges heat with the cooling water in the cooling water flow passage 3 at the second heat exchanger 11. As the heating liquid, an antifreeze liquid such as ethylene glycol is used.

Part of the heating liquid flow passage 5 is closely disposed along the surfaces of the cooling water tank 8 and the cooling pump 9. Moreover, part of the heating liquid flow passage 5 is closely disposed along a part of the cooling water flow passage 3 where the cooling water particularly tends to remain. This is in order to, even if the cooling water partly remains in the cooling water flow passage 3 and freezes at the time of draining described later, unfreeze it when power is supplied by an external power source. The external power source is, as an example, a storage battery provided for power supply at the time of startup of the fuel cell system 1. Moreover, when a cylinder incorporating a hydrogen storage alloy as the hydrogen supply portion is used, the heating liquid flow passage 5 may be disposed adjacent to the cylinder.

The air flow passage 6 is a flow passage that connects the cooling water flow passage 3 and the cooling water tank 8 and is not opened to the atmosphere. Specifically, the air flow passage 6 is a tubular member. One end of the air flow passage 6 is connected from above on the downstream side of the second heat exchanger 11 and the upstream side of the ion exchange resin 12 in the flow direction of the cooling water in the cooling water flow passage 3 and is connected from above on the uppermost part of the cooling water flow passage 3 in the vertical direction. The other end of the air flow passage 6 is connected to the upper surface of the cooling water tank 8. The other end of the air flow passage 6 is only necessarily connected in a position higher than the liquid level inside the cooling water tank 8. The air flow passage 6 is disposed so as to pass a position higher than the uppermost part of the cooling water flow passage 3. At one end of the air flow passage 6, one air shut-off valve 18 is provided. The air shut-off valve 18 is a normally open type electromagnetic valve. Specifically, the air shut-off valve 18 is controlled so as to be closed during power generation, and is controlled so as to be opened when power is shut off and when draining is performed. The flow passage cross-sectional area of the air flow passage 6 is smaller than the flow passage cross-sectional area of the cooling water flow passage 3. For example, the air flow passage 6 is formed of piping with an inside diameter of 6 mm, and the cooling water flow passage 3 is formed of piping with an inside diameter of 8 mm.

The cooling water bypass passage 7 is piping that connects the cooling water flow passage 3 and the cooling water tank 8. One end of the cooling water bypass passage 7 is connected on the downstream side of the ion exchange resin 12 and the upstream side of the conductivity meter 13 in the flow direction of the cooling water in the cooling water flow passage 3 and below the ion exchange resin 12 and the conductivity meter 13 in the vertical direction. The other end of the cooling water bypass passage 7 is connected to the upper surface of the cooling water tank 8. In the middle of the cooling water bypass passage 7, a bypass valve 19 is disposed. The bypass valve 19 is a normally open type electromagnetic valve. Specifically, the bypass valve 19 is controlled so as to be closed during power generation, and is controlled so as to be opened when power is shut off and when draining is performed.

The fuel cell system 1 of the above-described structure generates power by supplying hydrogen to the stack 2 from the hydrogen supply portion and supplying oxygen thereto from the oxygen supply portion when an instruction for power generation is received, for example, from an external device. As an example, the external device is a switch that accepts an operation by the user. As another example, the external device is a remote control device. At this time, the fuel cell system 1 is provided with a reception device that accepts an instruction for power generation transmitted from the remote control device.

The fuel cell system 1 activates the cooling pump 9, the heat releasing pump 15 and the heating pump 16. Thereby, the cooling water circulates through the cooling water flow passage 3, the heat releasing liquid circulates through the heat releasing liquid flow passage 4, and the heating liquid circulates through the heating liquid flow passage 5. At the time of power generation at the stack 2, the air shut-off valve 18 and the bypass valve 19 are closed.

The reaction caused in the power generation at the stack 2 is an exothermic reaction, and the stack 2 is cooled by the cooling water flowing through the cooling water flow passage 3. The heat of the cooling water discharged from the stack 2 is conducted to the heat releasing liquid in the heat releasing liquid flow passage 4 at the first heat exchanger 10, and the heat releasing liquid releases heat at the radiator 14.

The heat of the cooling water having passed through the first heat exchanger 10 and being further introduced into the second heat exchanger 11 is conducted to the heating liquid in the heating liquid flow passage 5 at the second heat exchanger 11. The heat conducted to the heating liquid is conducted to the cooling water tank 8 and part of the cooling water flow passage 3 disposed close to the heating liquid flow passage 5. As an example, the part disposed close to the heating liquid flow passage 5 is the part of the cooling water flow passage 3 between the cooling water tank 8 and the cooling pump 9, and the cooling pump 9. Moreover, when a cylinder incorporating a hydrogen storage alloy as the hydrogen supply portion is used, the heat conducted to the heating liquid is also conducted to the cylinder. Since the reaction when the hydrogen storage alloy releases hydrogen is an endothermic reaction, the cylinder incorporating the hydrogen storage alloy can release hydrogen by the heat being conducted thereto from the heating liquid.

When receiving an instruction to stop power generation from an external device or the like, the fuel cell system 1 stops the supply of hydrogen and oxygen to the stack 2 and enters a standby state. Specifically, the standby state is a state in which power is supplied to the fuel cell system 1 and power generation is stopped. In the standby state, for example, when the ambient temperature is below zero, there is a possibility that the cooling water freezes. When the cooling water freezes, there is a possibility that the cooling water expands to thereby break a part such as the stack 2. For this reason, in the standby state, the fuel cell system 1 activates the cooling pump 9 and the heating pump 16, and causes heat exchange between the heating liquid and the cooling water at the second heat exchanger 11 to prevent the cooling water from freezing. Further, the fuel cell system 1 activates the heater 17.

However, in a case where power is shut off, for example, when the fuel cell system 1 is maintained or stored for long periods, the cooling pump 9, the heating pump 16 and the heater 17 cannot be activated. For this reason, when receiving an instruction to shut off power from an external device or the like, the fuel cell system 1 performs draining before shutting off power.

In a case where the fuel cell system 1 receives an instruction for draining from an external device or the like in the standby state, when the cooling pump 9 is activated, the fuel cell system 1 stops the cooling pump 9. Moreover, the air shut-off valve 18 and the bypass valve 19 are opened.

The air in the cooling water tank 8 is introduced into the cooling water flow passage 3 through the air flow passage 6 and the air shut-off valve 18. The air introduced into the cooling water flow passage 3 enters the ion exchange resin 12, and the cooling water in the ion exchange resin 12 enters the cooling water tank 8 through the cooling water bypass passage 7. Moreover, the air introduced into the cooling water flow passage 3 enters the second heat exchanger 11 and the first heat exchanger 10, and the cooling water in the second heat exchanger 11 and the first heat exchanger 10 enters the cooling water tank 8 through the cooling pump 9. In this case, it is not always necessary that the cooling water in the cooling pump 9 be all discharged into the cooling water tank 8, and the cooling water may partly remain in the cooling pump 9. Moreover, part of the air having passed through the ion exchange resin 12 enters the stack 2 through the conductivity meter 13, and the cooling water in the stack 2 enters the cooling water tank 8.

Since the cooling water in a part such as the stack 2 can be discharged into the cooling water tank 8 by performing draining as described above, even when the ambient temperature is below zero, the breakage of the stack 2 or the like can be prevented. Although the cooling water freezes in the cooling water tank 8, the cooling water tank 8 never breaks because it has a volume larger than the volume of the entire cooling water flow passage 3 excepting the cooling water tank 8.

When power is supplied by an external power source and the cooling water stored in the cooling water tank 8 and in the cooling pump 9 is frozen, the fuel cell system 1 can unfreeze the cooling water by the heat of the heater 17 by activating the heating pump 16 and the heater 17. After unfreezing the cooling water, the fuel cell system 1 enters the standby state.

According to the embodiment of the present disclosure, at the time of draining by the fuel cell system 1, the cooling water in the cooling water flow passage 3 is introduced into the cooling water tank 8 without the cooling water flow passage 3 communicating with the atmosphere. For this reason, vaporized cooling water can be prevented from being released to the atmosphere. By preventing the release of the cooling water, the decrease in the amount of cooling water is prevented, so that the cooling capacity of the stack 2 can be maintained. Moreover, the frequency of replenishment of the cooling water by maintenance can be reduced.

Moreover, since the cooling water flow passage 3 and the atmosphere never communicate with each other, the entry of dust, dirt, foreign matter and the like from the atmosphere into the cooling water flow passage 3 can be prevented. For this reason, the frequency of replacement and of replenishment of the cooling water by maintenance can be reduced.

Moreover, since one end of the air flow passage 6 is connected to the uppermost part of the cooling water flow passage 3 in the vertical direction, the cooling water in the entire cooling water flow passage 3 can be surely introduced into the cooling water tank 8.

Moreover, since one end of the cooling water bypass passage 7 is connected to the cooling water flow passage 3 in a position on the downstream side of the ion exchange resin 12 in the flow direction of the cooling water in the cooling water flow passage 3 and in a position below the ion exchange resin 12 in the vertical direction, the cooling water in the ion exchange resin 12 having a filter thereinside and having a high flow passage resistance can be surely introduced into the cooling water tank 8 through the cooling water bypass passage 7.

Moreover, in the fuel cell system 1, even when power is shut off without receiving an instruction for draining from an external device or the like, the air shut-off valve 18 and the bypass valve 19 which are normally open type electromagnetic valves are opened, so that the draining can be performed.

The stack 2 is an example of the power generation portion. The cooling water flow passage 3 is an example of the coolant flow passage. The cooling water bypass passage 7 is an example of the coolant bypass passage. The cooling water tank 8 is an example of the tank. The cooling pump 9 is an example of the circulation pump. The first heat exchanger 10 and the second heat exchanger 11 are an example of the heat exchanger. The air shut-off valve 18 is an example of the first on-off valve. The bypass valve 19 is an example of the second on-off valve.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:

1. A fuel cell system, comprising:
   a coolant flow passage through which a coolant flows that cools a power generation portion generating power by causing a reaction between hydrogen and oxygen;
   a circulation pump that operates to circulate the coolant in the coolant flow passage;
   a heat exchanger that exchanges heat with the coolant in the coolant flow passage;
   a tank disposed on the coolant flow passage in a position below the power generation portion in a vertical direction and storing the coolant;
   an air flow passage having its one end connected to the coolant flow passage and having its other end connected to the tank; and
   a first on-off valve provided on the air flow passage to open or close the air flow passage,
   wherein part of the air flow passage is disposed in a position higher than an uppermost part of the coolant flow passage in the vertical direction.

2. The fuel cell system according to claim 1, wherein one end of the air flow passage is connected to the coolant flow passage in a position on a downstream side of the heat exchanger and an upstream side of the power generation portion in a flow direction of the coolant in the coolant flow passage.

3. The fuel cell system according to claim 1, comprising an ion exchange resin that is provided on the coolant flow passage in a position on the downstream side of the heat exchanger and the upstream side of the power generation portion in the flow direction of the coolant in the coolant flow passage, and removes an ion from the coolant circulating in the coolant flow passage, wherein one end of the air flow passage is connected to the coolant flow passage in a position on the downstream side of the heat exchanger and an upstream side of the ion exchange resin in the flow direction of the coolant in the coolant flow passage.

4. The fuel cell system according to claim 3, wherein one end of the air flow passage is connected to the coolant flow passage in a position above the ion exchange resin in the vertical direction.

5. The fuel cell system according to claim 1, wherein one end of the air flow passage is connected to the uppermost part of the coolant flow passage in the vertical direction.

6. The fuel cell system according to claim 1, wherein one end of the air flow passage is connected to the coolant flow passage from above.

7. The fuel cell system according to claim 1, wherein the number of first on-off valves provided on the air flow passage is one.

8. The fuel cell system according to claim 1, wherein the first on-off valve is a normally open type electromagnetic valve.

9. The fuel cell system according to claim 1, wherein a flow passage cross-sectional area of the air flow passage is smaller than a flow passage cross-sectional area of the coolant flow passage.

10. The fuel cell system according to claim 3, comprising:
a coolant bypass passage having its one end connected to the coolant flow passage in a position on a downstream side of the ion exchange resin in the flow direction of the coolant in the coolant flow passage and in a position below the ion exchange resin in the vertical direction, and having its other end connected to the tank; and
a second on-off valve provided on the coolant bypass passage to open or close the coolant bypass passage.

11. The fuel cell system according to claim 10, wherein the second on-off valve is a normally open type electromagnetic valve.

* * * * *